United States Patent [19]

Hartmut

[11] 4,341,349

[45] Jul. 27, 1982

[54] APPARATUS FOR THE DAMPING OF BULK MATERIAL

[75] Inventor: Rieschel Hartmut, Hattingen, Fed. Rep. of Germany

[73] Assignee: Maschinenfabrik Koppern GmbH & Co. KG., Hattingen, Fed. Rep. of Germany

[21] Appl. No.: 164,973

[22] Filed: Jul. 1, 1980

[30] Foreign Application Priority Data

Mar. 7, 1979 [DE] Fed. Rep. of Germany ....... 2926713

[51] Int. Cl.[3] ......................... B05B 3/04; B65G 25/00

[52] U.S. Cl. ................................ 239/222.17; 414/206

[58] Field of Search ................... 239/222.17; 241/412; 414/205, 206

[56] References Cited

U.S. PATENT DOCUMENTS

| | | | |
|---|---|---|---|
| 2,309,036 | 1/1943 | Beardsley | 241/41 |
| 2,345,474 | 3/1944 | Haverland | 244/41 |
| 2,965,250 | 12/1960 | Johansson | 414/206 |
| 3,254,848 | 6/1966 | Stephanoff | 241/41 |
| 4,116,345 | 9/1978 | Greaves et al. | 414/205 |

*Primary Examiner*—James B. Marbert

*Attorney, Agent, or Firm*—Salter & Michaelson

[57] ABSTRACT

Apparatus for the damping of bulk material in which a liquid is to be sprayed into a falling stream of the material, the apparatus including an upright tubular shaft through which the material is to fall in a stream; a plate arranged coaxially below the lower end of the tubular shaft and defining an annular gap between the tubular shaft and the plate through which the material will pass after falling through the tubular shaft; at least one spray nozzle arranged below the plate in a spraying region, and a housing which encloses the lower end of the tubular shaft, the plate and the spraying region and nozzle or nozzles.

20 Claims, 1 Drawing Figure

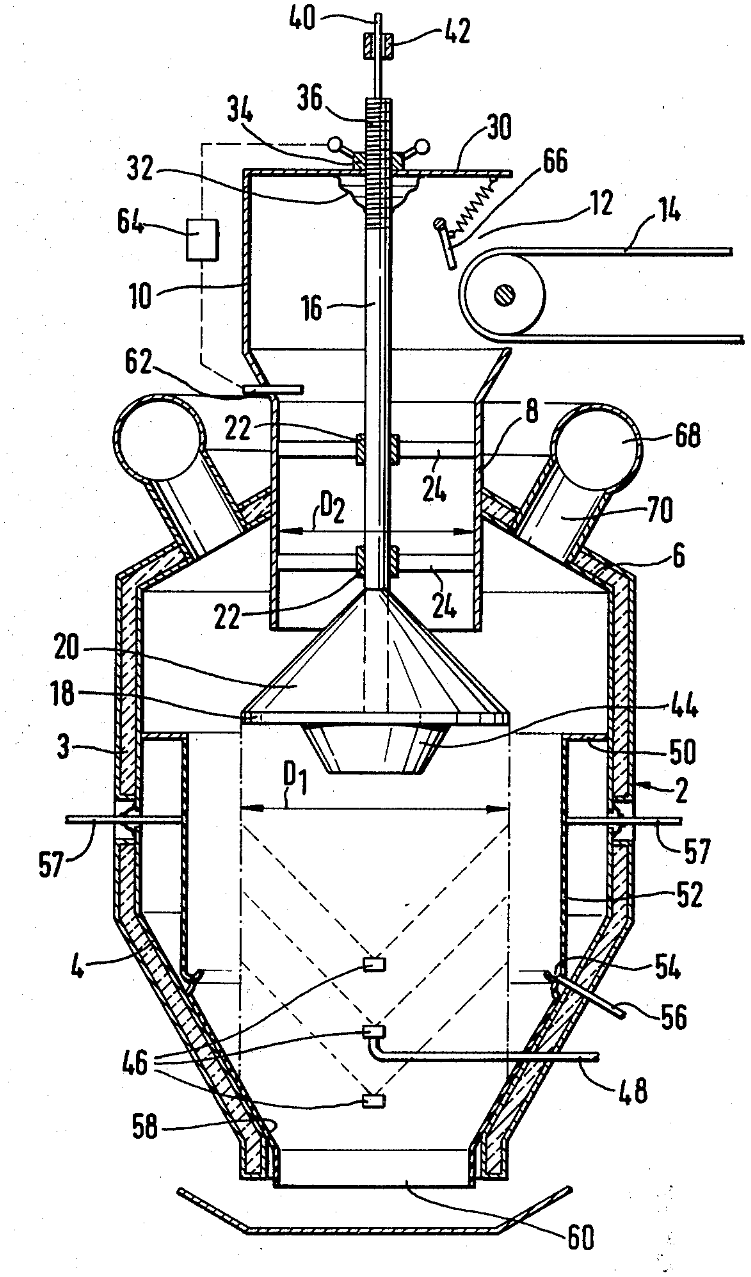
40
42
36
34
30
32
66
12
14
64
10
16
62
8
68
22
24
70
D2
6
22
24
20
18
44
3
50
D1
2
57
57
52
4
54
56
46
48
58
60

APPARATUS FOR THE DAMPING OF BULK MATERIAL

APPARATUS FOR THE DAMPING OF BULK MATERIAL

The invention relates to apparatus for the damping of bulk material by spraying water or other liquid into a falling stream of the material.

BACKGROUND OF THE INVENTION

In the fertiliser industry, granules of a fertiliser salt or other fertiliser, preferably having a particle size of 1–4 mm, are required in increasing quantities because of the use of mechanical spreaders. These granules are mainly produced in the potash industry by the use of the so-called press granulation method. In this method, the fine-grained fertiliser salt is first pressed in a roll press to give a so-called shell which is formed into granules in a subsequent disintegration-sieve stage. The strength of the granules depends to a very high degree on the pretreatment of the potassium salt. Salts which are produced by a crystallisation process and which have not been mixed with a so-called anti-caking medium can, in general, be formed as granules of high strength. In contrast, granules produced from flotation salts are less strong. This results from the fact that chemical residues from the flotation process, in particular amines, adhere to the surface of the primary granules and interfere with the formation of a strong binding. Such types of granules are, in many cases, subjected to an after-treatment process which consists essentially of the step damping followed by drying. It is an object of this after-treatment to keep abrasion during handling (for example during bunkering, loading and transport) low and to limit the dust nuisance which is connected with it. For this purpose dust-binding media are sometimes added to the liquid used for damping.

If the surface of the granules or other bulk material is damped with an amount of water between 0.5 and 2% of the weight of the material there is produced during the subsequent drying of the material a strengthening of the periphery of the apparatus thereof, as a result of which the resistance of the granules to abrasion is increased.

DESCRIPTION OF THE PRIOR ART

Two different principles are known for the damping treatment.

It is known, in one case, to sprinkle the material during transport on a moving belt and/or subsequently to turn the material on the belt by means of a sort of plough share. By this treatment it is only possible to achieve a very uneven distribution of the moisture. It is also known to arrange damping nozzles at the position of discharge from a conveyor belt and thus to spray the moisture into the stream of material falling from the belt. In this method also it is hardly possible to achieve a uniform distribution of moisture due to the generally, relatively large thickness of the stream of material discharged from the conveyor. However both methods have the advantage that the material is subjected to relatively little mechanical stress during the damping process.

In order to produce a considerably greater uniformity of damping of the surface of the granules of the material it is known to turn the material in mixing screws, mixing drums or other types of mixer and to spray it with water during this process. However such devices exert a considerable mechanical stress on the granules so that, depending on their strength, a more or less high loss due to abrasion before the desired strengthening of the surface of the granules has to be taken into account. This loss is equivalent to a loss of production. The desired increase in the resistance to abrasion of the granules is only achieved during and after drying of the granules by means of recrystallisation processes. A degree of mechanical stress is desirable in order to anticipate abrasion which might occur later. However in the mixers referred to in this paragraph, the mechanical stress producing abrasion occurs before and during damping and thus occurs too early. Mechanical stress on the granules during and after drying coincides with increasing strength of the periphery of individual granules so that, in this case, only those parts of the periphery which are really sensitive to abrasion are worn away.

It is an object of the invention to produce apparatus by means of which the granules of a bulk material can be uniformly damped in the simplest possible way with an amount of water or other liquid which can be measured relatively accurately and without considerable mechanical abrasive stress, such as is inevitable in mechanical mixers, being applied during the damping process.

SUMMARY OF THE INVENTION

According to the invention, apparatus for the damping of bulk material in which a liquid is to be sprayed into a falling stream of the material comprises an upright tubular shaft through which the material is to fall in a stream; a plate arranged coaxially below the lower end of the tubular shaft and defining an annular gap between the tubular shaft and the plate through which the material will pass after falling through the tubular shaft; at least one spray nozzle arranged below the plate in a spraying region, and a housing which encloses the lower end of the tubular shaft, the plate and the spraying region.

The plate is conveniently mounted to be axially movable and rotatable by means of a supporting rod which passes through the tubular shaft.

Other additional and optional features of the apparatus are described in the detailed description which follows.

BRIEF DESCRIPTION OF THE DRAWING AND DESCRIPTION OF THE PREFERRED EMBODIMENT

Apparatus in accordance with the invention for damping bulk material, especially salt granules, is illustrated schematically in the accompanying drawing which is a vertical section through the apparatus and is now described by way of example with reference to the drawing.

The apparatus comprises a housing 2 having a peripheral wall 3 which is preferably cylindrical. The housing has a lower part forming a conical discharge tube 4. In the upper part of the housing 2 there is an upright tubular shaft 8 which passes centrally through a housing cover 6, the shaft being provided at its upper end with an inlet housing 10, which has on one side an open inlet 12 into which the discharge end of a conveyor belt 14 extends.

Centrally within the shaft 8 there is a rod 16 which can be moved axially upwardly and downwardly by means of a nut 34 and screw threaded section 36 of the rod 16. The lower end of the rod 16 supports a spray plate 18 which carries an upward-directed conical cover 20 on its upper side. The diameter $D_1$ of the spray plate 18 is larger than the internal diameter $D_2$ of the shaft 8 so that a defined spray periphery is produced as will hereinafter be explained.

The rod 16 is supported in annular bearings 22 supported within the shaft 8 by radial struts 24. At its upper end the rod 16 passes through a bone in a cover plate 30 of the housing 10, the passage of the rod 16 through the bore being sealed by a bellows 32 situated within the housing 10. On the upper side of the cover plate 30 there is the aforesaid nut 34 which engages the threaded section 36 on the upper end of the rod 16. The nut 34 is preferably arranged to be rotated by a driving electric motor. At the upper end of the rod 16 there is an armature bolt 40 extending co-axially from the rod 16 and which projects into an induction coil 42. The purpose of this will be explained hereinafter. A vibrator may also be provided to vibrate the spray plate 18. In the drawing an electromagnetic vibrator 44 is attached to the underside of the spray plate 18 but the vibrator may also be designed in similar form and be mounted on the upper side of the spray plate 18 and covered by the conical cover 20. Current supply for the electromagnetically operated vibrator 44 may be made through the rod 16 which is designed to be hollow.

Coaxial with the rod 16 in the space below the spray plate 18 there are a plurality of spray nozzles 46 (for example, three) which are arranged one above another in the axial direction of the housing 2 and which are designed as hollow cone nozzles, having, for example, a spray angle of 90°. The direction of spraying is directed upwards as is indicated by the schematic spray cone limits shown in the drawing. The spray nozzles are supported by water supply conduits 48, of which only one is illustrated. The distance between the spray nozzles 46 in the axial direction may be adjustable.

In the vicinity of the spray plate 18 there is an annular mounting 50 which is attached to the inside of the wall 3 of the housing 2 and from which resilient aprons 52 are suspended. These may be separate aprons or a single resilient tube. At the lower end of the apron or aprons 52 there are inwardly directed water collecting channels 54 connected to water outlets 56, of which one only is shown.

A vibration device is provided for the aprons 52. The vibration device illustrated, by way of example, is in the form of vibration rods 57 which are passed through openings in the wall 3 of the housing and which are in contact with the aprons 52. It would, for example, be possible to provide a ring which is supported by the vibration rods 57 and which surrounds the aprons 52 loosely on the outside thereof. The aprons 52 extend into the conical outlet 4 of the housing 2. The conical outlet 4 is then further provided with a resilient lining 58. The outlet 60 of the lining 58 is preferably smaller in diameter than the spray plate 18.

The apparatus described operates as follows:

The bulk material, for example salt granules to be damped is transported on the conveyor belt 14 and is discharged therefrom into the shaft 8. The spray plate 18 is so positioned that a column of the bulk material is formed within the shaft 8 and is maintained during operation. Thus the bulk material delivered by the conveyor belt 14 has only a relatively small distance to fall before it reaches the level of the material inside the shaft 8. The bulk material falls through the gap between the lower end of the shaft 8 and the guide cone 20 on the upper side of the spray plate 18. The stream of bulk material formed by the gap becomes narrower towards the outer circumference of the spray plate 18 and then falls as a thin cylindrical tube of material downwards over the edge of the spray plate 18. At the end of its fall the bulk material strikes the resilient lining 58 within the sloping inner surface of the conical outlet end 4 of the housing 2 and is thereby slowed down in a protective manner and guided inwards.

The spray nozzles 46 arranged one above the other form an outwardly directed cylinder of spray of water which impinges on the bulk material. Due to this, since very small drops of moisture impinge on the material throughout the whole height of its fall, which may be of the order of magnitude of 0.4 to 1.2 m, the individual granules of the material acquire an angular momentum and thus they rotate during their free fall and are thus substantially uniformly damped on all surfaces thereof.

The density of the material stream can be adjusted by means of the adjusting nut 34 which causes the size of the gap between the lower end of the shaft 8 and the guide cone 20 on the spray plate 18 to be altered. At the upper end of the shaft 8 there is a height probe 62 which responds to a rise or fall in the level of material in the shaft 8 and delivers, through an automatic control device 64, a control signal to the motor drive of the adjusting nut 34 for the rod 16, by means of which the gap at the lower end of the shaft 8 is temporarily increased or decreased in order to adjust the throughout to the rate of supply of material. It is also possible for the height probe 62 to control the speed of the conveyor belt 14 either simultaneously to adjusting the height of the rod 16 or as an alternative adjustment.

The water supply to the spray nozzles 46 can be controlled by means of output signals from the induction coil 42, which depend on the position of the armature bolt 40 and the rod 16 and thus on the throughout gap at the lower end of the shaft 8. Thus the amount of water sprayed in is automatically adjusted to the rate of flow of material.

At the discharge end of the conveyor belt 14 there is also provided in the housing 10, a control device 66 which may, for example, be designed as a spring-loaded rocking lever. If the supply of material on the conveyor belt 14 is interrupted or falls below a predetermined rate the lever 66 is rotated counter-clockwise by the force of a return spring and can close a main valve for supply of water to the spray nozzles 46. This lever 66 therefore serves as an automatic control of the water supply.

In order to prevent precipitation of steam produced by the bulk material, when it is hot, the inside of the housing is provided with an insulation layer and also a vapour exhaust system is provided. Fertiliser salt is often pressed and subsequently granulated at temperatures above 100° C., sometimes above 130° C. In a continuous process this granulate is then fed into the damping apparatus provided by the invention. The vapour exhaust system may, for example, be designed as an annular conduit 68 into which spaced exhaust pipes 70 which pass through the upper wall 6 of the housing 2 lead. In this case the annular conduit 68 is connected to an exhaust pump. Air is drawn in through the lower outlet 60 of the housing 2 by means of the exhaust pump so that the removal of vapour is ensured throughout the whole height of the housing. At the same time the cloud of water spray is sucked through the downward falling material and thus the damping effect is reinforced.

In spite of this it is impossible to avoid condensation of water mist on the walls, in particular in the region of the resilient aprons 52. The water-collecting channels 54 are provided to prevent this water from running downwards onto the discharge belt, shown beneath the open end of the housing. In a similar manner it would be possible, in addition, to provide a water-collecting channel on the upper side of the supporting ring 50, by means of which water deposited on the walls in the upper part of the housing 2 can be removed. Dust, which is carried radially outwards by the water spray out of the cloud of material, is deposited on the aprons 52 and must be shaken off periodically. The vibration device described herein is provided for this purpose and may be activated either periodically during operation of the apparatus or during periods of shut-down.

The damping apparatus described herein leads to extremely uniform damping of the granulated salt. Additionally the salt or other material is handled in a very careful manner in the apparatus. The apparatus has, a high throughput capacity. For example, with a diameter of the spray plate 18 of 636 mm, the discharge periphery will be approximately 2 m. By means of apparatus designed in this way, it is possible for a stream of bulk material of 75 t/hr to be uniformly distributed as a cylindrical cloud of material and for the individual granules to be damped uniformly over the whole of their surfaces by means of a water mist, so that a surface damping with 0.5 to 2% of water can be maintained within a very narrow tolerance. The apparatus provided by the invention has the particular advantage that there are no moving parts, mixing elements or conveyors except for the inlet conveyor 14.

The apparatus described is intended in particular for the damping of salt granules and is particularly suitable for the damping of hot granules. It can, however, also be used for other bulk materials for which uniform damping within narrow tolerances is required.

What I claim as my invention and desire to secure by Letters Patent of the United States is:

1. Apparatus for the damping of bulk material in which a liquid is to be sprayed into a falling stream of said material, the apparatus comprising an upright tubular shaft through which the material is to fall in a stream; a plate arranged coaxially below the lower end of the tubular shaft and defining an annular gap between the tubular shaft and the plate, through which gap the material will pass after falling through the tubular shaft; at least one spray nozzle arranged below the plate in a spraying region, and a housing which encloses the lower end of the tubular shaft, the plate and the spraying region.

2. Apparatus according to claim 1, including a supporting rod on which the plate is mounted to be axially movable and rotatable, said supporting rod passing through said tubular shaft.

3. Apparatus according to claim 1, including a vibrator carried by said plate.

4. Apparatus according to claim 1 including a conical cover mounted on the upper face of said plate.

5. Apparatus according to claim 2 including radial arms in the lower end of said tubular shaft, said supporting rod for said plate supported by said radial arms.

6. Apparatus according to claim 1 including at least one resilient apron arranged inside said housing at least in said spraying region.

7. Apparatus according to claim 6, including at least one water-collection channel at the lower end of said apron.

8. Apparatus according to claim 6 in which the housing is reduced in diameter conically below said spraying region and including a resilient lining within the inner wall surface of said housing in said spray region.

9. Apparatus according to claim 6 including at least one vibration element passing through a wall in said housing to vibrate each said apron.

10. Apparatus according to claim 1 including outlet means for vapour exhaust in an upper region of said housing.

11. Apparatus according to claim 1 including a chamber, closed except for a lateral filling opening, at the upper end of said tubular shaft, said chamber forming an input opening to accept the discharge end of a supply conveyor and including within said chamber a switching element which is responsive to the input flow of material to control the water supply to each said spray nozzle.

12. Apparatus according to claim 2 including a height probe in the upper end of said tubular shaft and control means to adjust the height of said plate to vary the annular gap between the lower end of the tubular shaft and said plate in accordance with signals generated by said height probe.

13. Apparatus according to claim 1 in wich each said spray nozzle is arranged coaxially with the axis of said plate.

14. Apparatus according to claim 13 in which each said spray nozzle is of the upwardly-directed hollow cone type.

15. Apparatus according to claim 2 including means to adjust the supply of water to each said spray nozzle automatically in accordance with the gap between the lower end of said tubular shaft and said plate.

16. The apparatus of claim 1 further comprising at least one resilient apron disposed in said housing in said spraying region, said spraying nozzel being a hollow cone type spraying nozzel which is directed upwardly and disposed coaxially relative to said plate.

17. The apparatus of claim 16 further comprising at least one water collection channel at the lower end of said apron.

18. In the apparatus of claim 16, the portion of said housing beneath said spraying region being conically shaped and of reduced diameter, said apparatus further comprising a resilient lining on the inner surface of said housing in said spraying region.

19. The apparatus of claim 16 further comprising at least one vibration element which extends through a wall of said housing and into said spraying region to effect vibration of said apron.

20. In the apparatus of claim 1, said spraying nozzel being a hollow cone type spraying nozzel which is directed upwardly and disposed coaxially relative to said plate, said apparatus further comprising outlet means for vapor exhaust in the upper region of said housing.

* * * * *